(12) United States Patent
Chen

(10) Patent No.: US 11,851,141 B2
(45) Date of Patent: Dec. 26, 2023

(54) MARINE MOUNTING PART

(71) Applicant: NINGBO KAYAKA SPORTS CO., LTD, Ningbo (CN)

(72) Inventor: Bingrui Chen, Hangzhou (CN)

(73) Assignee: NINGBO KAYAKA SPORTS CO., LTD., Ningbo (CN)

( * ) Notice: Subject to any disclaimer, the term of this patent is extended or adjusted under 35 U.S.C. 154(b) by 0 days.

(21) Appl. No.: 16/959,342

(22) PCT Filed: Mar. 20, 2020

(86) PCT No.: PCT/CN2020/080294
§ 371 (c)(1),
(2) Date: Jun. 30, 2020

(87) PCT Pub. No.: WO2021/147161
PCT Pub. Date: Jul. 29, 2021

(65) Prior Publication Data
US 2022/0340241 A1    Oct. 27, 2022

(30) Foreign Application Priority Data

Jan. 20, 2020   (CN) .......................... 202010064786.9

(51) Int. Cl.
*B63B 34/26*    (2020.01)
*F16B 1/02*     (2006.01)

(52) U.S. Cl.
CPC ................ *B63B 34/26* (2020.02); *F16B 1/02* (2013.01)

(58) Field of Classification Search
CPC ................................... F16B 1/02; B63B 34/26
See application file for complete search history.

(56) References Cited

U.S. PATENT DOCUMENTS

| 2005/0102881 | A1* | 5/2005 | Legendziewicz | A01K 97/10 43/21.2 |
| 2009/0145249 | A1* | 6/2009 | Dubbeldam | G01D 11/30 73/866.5 |
| 2019/0247050 | A1* | 8/2019 | Goldsmith | A61F 2/82 |

FOREIGN PATENT DOCUMENTS

CN           1586776 A  *  3/2005  ............. B23B 51/12

* cited by examiner

Primary Examiner — S. Joseph Morano
Assistant Examiner — Jovon E Hayes
(74) Attorney, Agent, or Firm — Maschoff Brennan

(57) ABSTRACT

The utility model discloses a marine mounting part, and relates to the field of a marine accessory. A main body thereof is a mounting part, and the mounting part is provided with a mounting base and an accessory mounting portion, characterized in that the mounting base is provided with a quick connector, and the mounting base and the accessory mounting portion are movably connected through the quick connector. The quick connector is easy and flexible to operate, and the mounting base and the accessory mounting portion are connected through the quick connector, so that the user can easily and quickly dismount and replace the accessory mounting portion.

16 Claims, 9 Drawing Sheets

MARINE MOUNTING PART

TECHNICAL FIELD

The utility model relates to the field of accessories for ships and boats, and in particular to a marine mounting part.

BACKGROUND

Many kayak enthusiasts like to install a variety of external accessories on the kayaks, such as fishing rod, GPS navigation, fish finder, etc.; the mounting parts of these accessories are mostly integrated, even if the mounting parts are not the integrated mounting parts, most of mounting portions and bases of the accessories thereof are movably connected through connecting parts such as bolts, for example, the accessories of a raft fishing bracket recorded in the patent document of Chinese patent publication no. CN209073293U are connected through bolts, and if a rear bracket is damaged or needs to be removed for replacement for other reasons, the bolts used for connecting the rear bracket need to be unscrewed; and the unscrewed bolts are not the best choice from the user's point of view, and the bolts are also used for a marine mounting part, as a connector, often exposed, easy to be contact with water, causing the corrosion, and more difficult to unscrew.

SUMMARY

In order to solve the above technical problems, the purpose of the utility model is to provide a marine mounting part having an accessory mounting portion replaced conveniently.

To achieve the above purpose, the technical solution adopted in the utility model is that: a marine mounting part, with a main body which is a mounting part provided with a mounting base and an accessory mounting portion, characterized in that the mounting base is provided with a quick connector, and the mounting base and the accessory mounting portion are movably connected through the quick connector.

By adopting the above technical solution, the quick connector is easy and flexible to operate, and the mounting base and the accessory mounting portion are connected through the quick connector, so that the user can easily and quickly dismount and replace the accessory mounting portion.

Preferably, the quick connector is provided with a sliding sleeve.

By adopting the above technical solution, the sliding sleeve as an operating mechanism is arranged on the quick connector, and the user only needs to operate the sliding sleeve to control the quick connector to realize the dismounting and replacement of the accessory mounting portion, which further achieves the purpose of convenient replacement.

Preferably, the quick connector is provided with a ring groove.

By adopting the above technical solution, the ring groove is arranged on a male connector of the quick connector, steel balls are arranged in a female interface, after the male connector is inserted into the female interface, and the steel balls are matched with the ring groove, which can achieve the longitudinal limit and the purpose of locking the quick connector.

Preferably, the quick connector is provided with a plurality of limited posts.

By adopting the above technical solution, the male connector and the female interface of the quick connector are provided with the plurality of limited posts, and the limited posts on the male connector are matched with the gap among the limited posts in the female interface, so that the joggling is realized between the male connector and the female interface, thereby realizing the lateral locking, that is, the male connector can not move horizontally in the female interface, and the structure stability of the quick connector is improved by joggling.

Preferably, the mounting base is provided with a recessed structure.

By adopting the above technical solution, the recessed structure is circularly arranged on an outer side of the mounting base, so that the user can easily grasp the mounting base for operation.

Preferably, the mounting base is provided with fasteners.

By adopting the above technical solution, the mounting base can be connected with a hull through fasteners, which can ensure the stability of the connection between the mounting base and the hull.

Preferably, the mounting base is provided with a sliding rail.

By adopting the above technical solution, the sliding rail is arranged on a surface of the hull, and the mounting base is connected with the hull through the sliding rail, so that the mounting part can flexibly slide along the sliding rail on the hull.

Preferably, the sliding rail is provided with an elastic connecting part.

By adopting the above technical solution, the mounting base is connected with the sliding rail through the elastic connecting part, and when the elastic connecting part is tightened by operation, the bottom of the mounting base will be closely attached on the surface of the sliding rail, so that the mounting base can not slide, that is, the locking effect is achieved.

Preferably, the elastic connecting part is provided with a bulged structure.

By adopting the above technical solution, the bulged structure is specifically arranged on both sides of the sliding rail, and is horizontally higher than an upper surface of the sliding rail, and when the elastic connecting part is tightened, the bottom of the mounting base will be directly and closely attached on the upper surface of the bulged structure, and in such a timely tightening of the elastic connecting part too tight, the mounting base will not be pressed to the sliding rail, that is, the bulged structure plays the role of protecting the sliding rail.

Preferably, the accessory mounting portion is provided with an accessory connector.

By adopting the above technical solution, a plurality of sawteeth are arranged on a surface of the accessory connector, which has the effect of improving the stability of the connection.

Compared with the prior art, the advantages of the utility model lie in: (1) the users can easily and quickly dismount and replace the accessory mounting portion; (2) the male connector and the female interface of the quick connector are joggled, which has the higher stability; (3) the mounting part can flexibly slide on the hull; and (4) the mounting part can be switched between sliding and locking on the hull, and in the locking state, the excessive tightening is also not needed to be worried.

In figures, 1 is a mounting base; 110 is a recessed structure; 120 is a screw hole; 130 is a female interface; 131 is a steel ball; 132 is a clamp; 133 is a spring; 134 is a sliding sleeve; 135 is a limited post A; 136 is a clamp groove; 140 is a screw stem; 2 is an accessory mounting portion; 210 is an accessory connector; 220 is a male connector; 221 is a ring groove; 222 is a limited post B; 3 is a sliding rail; 310 is a sliding block; 4 is a bulged structure; and 5 is a hull.

DETAILED DESCRIPTION

The utility model will be further described in detail below in combination with the embodiments of the drawings.

Embodiment 1

A marine mounting part, a main body of thereof is composed of a mounting base 1 and an accessory mounting portion 2, and a quick connector is arranged between the mounting base 1 and the accessory mounting portion 2, which are movably connected through the quick connector; and specifically, the quick connector comprises a female interface 130 arranged on an end of the mounting base 1 and a male connector 220 arranged on an end of the accessory mounting portion 2, as shown in FIG. 1 to FIG. 4, and the male connector 220 and the female interface 130 can be plugged quickly and correspondingly, thereby achieving the purpose of quick dismounting of the mounting base 1 and the accessory mounting portion 2.

The male connector 220 is arranged on an end of the accessory mounting portion 2, and is integrated with the accessory mounting portion 2 as a whole.

Figure 3:
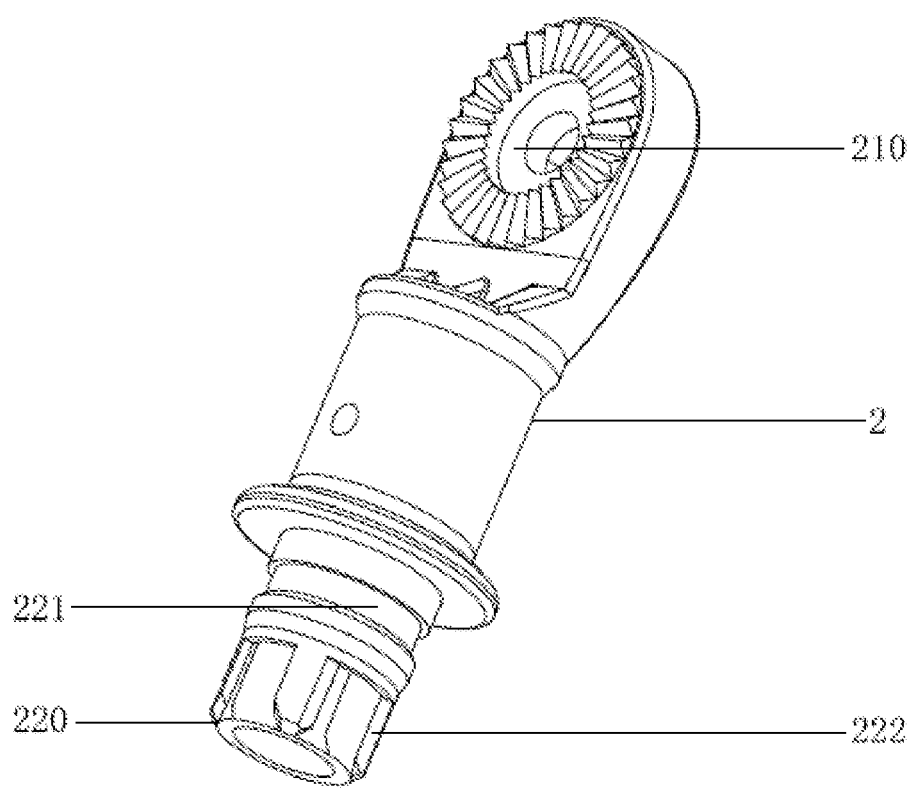
FIG. 3 is a structural diagram of a mounting portion of an embodiment 1 of the utility model.

The male connector 220 is provided with a ring groove 221 around a side wall, as shown in FIG. 3.

The surface of the male connector 220 and the ring groove 221 are also adjacently provided with a plurality of limited posts B222, and the limited posts B222 are vertically oriented and are circularly arranged on a surface of the male connector 220 to form a concave-convex ordered male connection structure, as shown in FIG. 3, and the limited posts B222 and the male connector 220 are integrated as a whole.

The female interface 130 is arranged on the end of the mounting base 1, and is integrated with the mounting base 1 as a whole.

Figure 5:
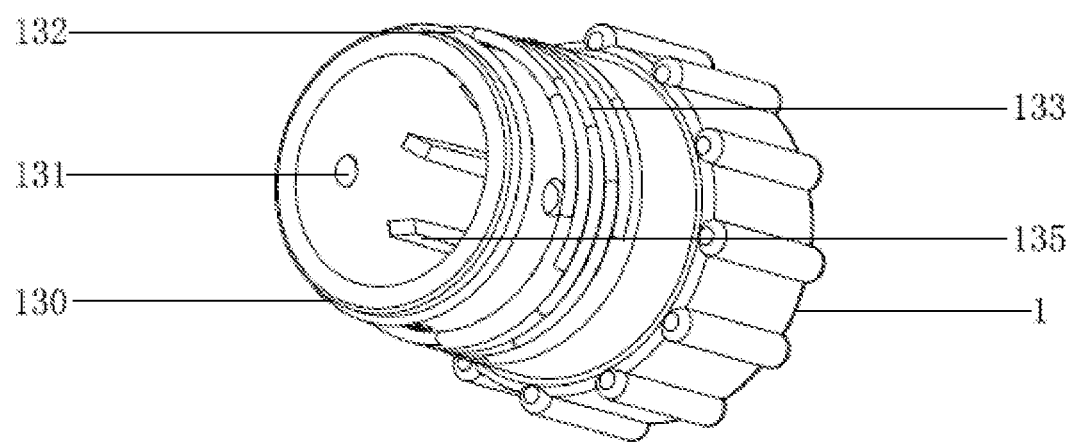
FIG. 5 is an internal structural diagram of a sliding sleeve of a female interface of a quick connector of the utility model.

A plurality of steel ball holes are arranged on a side wall of the female interface 130, and the steel balls 131 are arranged on the steel ball holes, as shown in FIG. 5. One side of the steel ball hole close to the inner wall has a small aperture, which can make the part of the steel ball 131 protrude, so that the steel ball 131 can protrude from the inner wall of the female interface 130 without falling off the side.

The outer side wall of the female interface 130 is sleeved with a spring 133, as shown in FIG. 5, and the height of the spring 133 touches the steel ball hole, which can hold the steel ball 131 so that the spring protrudes towards the inner wall of the female interface 130.

Figure 4:
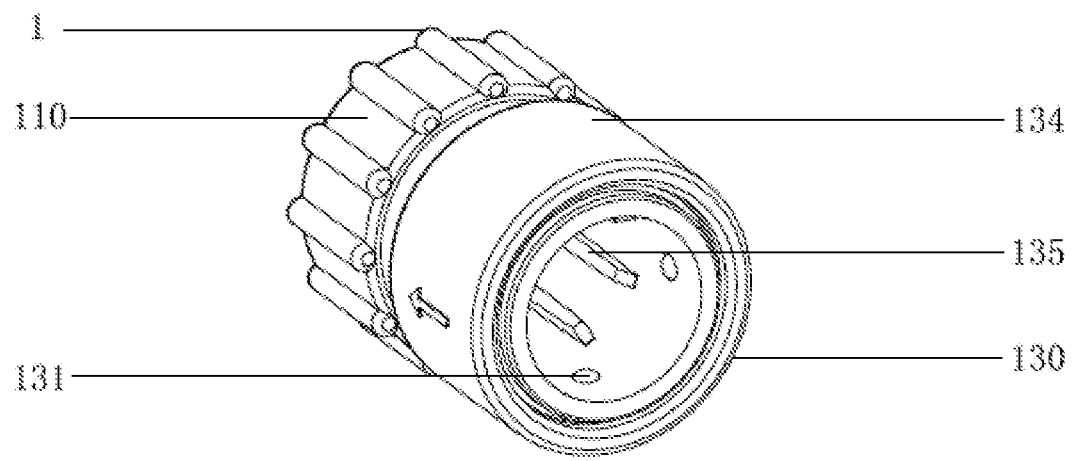
FIG. 4 is a structural diagram of a female interface of a quick connector of the utility model.

The outer side wall of the female interface 130 is sleeved with a sliding sleeve 134, as shown in FIG. 4; the gap between the sliding sleeve 134 and the steel ball hole is smaller than the diameter of the steel ball 131, that is, the steel ball 131 will not fall into the gap between the sliding sleeve 134 and the female interface 130 without being held by the spring 133; the inner wall of the sliding sleeve 134 is connected with the spring 133 in a matching manner, and the sliding sleeve 134 slides in the direction of the mounting base 1, that is, the sliding sleeve 134 slides down, the spring 133 will be pressed down, and at this time, the steel ball 131 is not held and can roll to the side of the sliding sleeve 134; and the spring 133 bounces back under the action of tension after the user lets go the spring 133, which brings the sliding sleeve 134 to bounce back and return.

Figure 1:
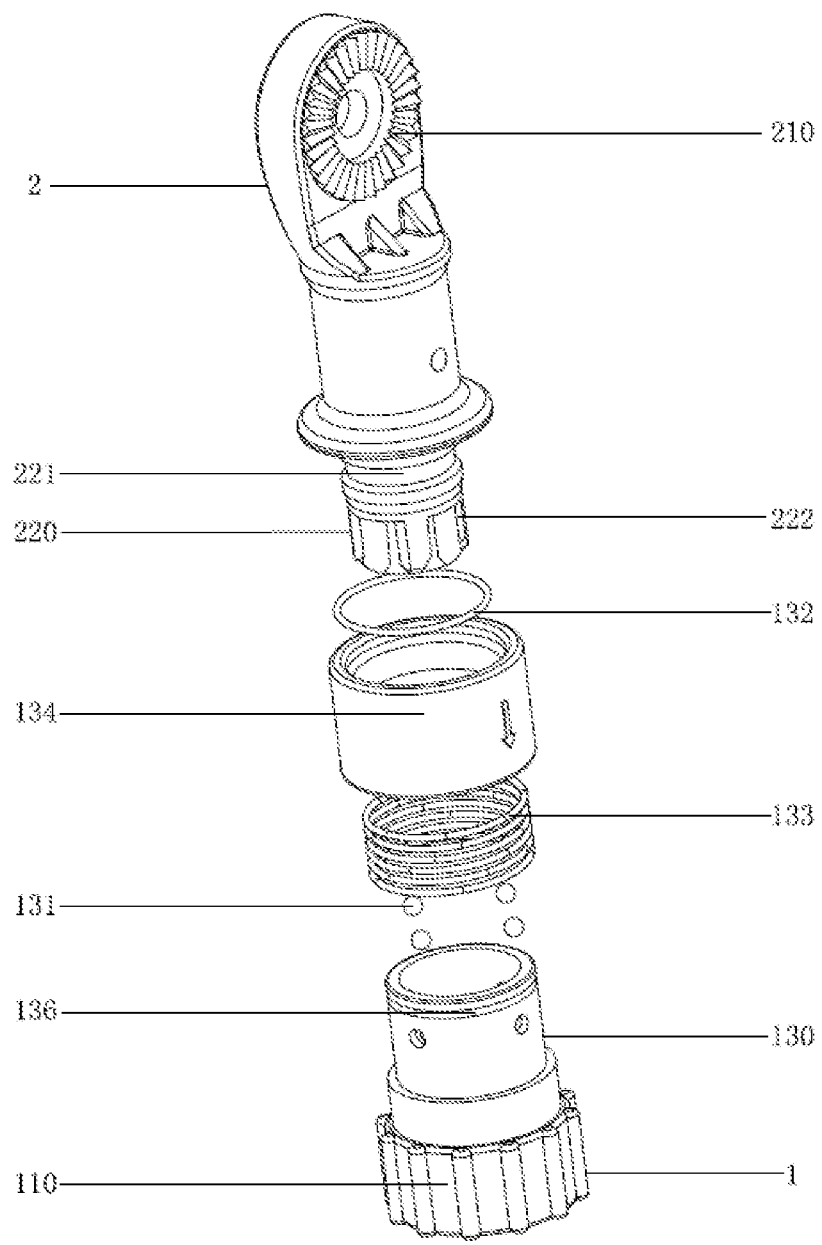
FIG. 1 is an explosive diagram of a main structure of an embodiment 1 of the utility model.

A clamp groove 136 is arranged on an outer side wall of the female interface 130 near the interface, and the clamp 132 is arranged on the clamp groove 136 in the matching manner, as shown in FIG. 1 and FIG. 5; and an upper opening of the sliding sleeve 134 is matched with the clamp 132 to realize the limit, so that the sliding sleeve 134 bounces back upwards and returns, and will not be separated from the female interface 130 under the limit of clamp 132.

A plurality of limited posts A135 are arranged on an inner side wall of the female interface 130, the limited posts A135 are vertically oriented, and are circularly arranged on the inner wall of the female interface 130 to form a concave-convex ordered female connection structure, as shown in FIG. 4 and FIG. 5; and the limited posts A135 and the inner wall of the female interface 130 are integrated as a whole.

The operating principle of the quick dismounting of this mounting part is that: when the sliding sleeve 134 of the female interface 130 on one end of the mounting base 1 slides down, and the spring 133 matched therewith is then pressed down, so that and the steel ball 131 can roll towards the sliding sleeve 134 without being held by the spring 133; the male connector 220 on one end of the accessory mounting portion 2 can be inserted into the female interface 130 in a matching manner, after being inserted, the ring groove 221 on the male connector 220 corresponds to the positions of a plurality of steel balls 131 on the female interface 130, and the user loosens the sliding sleeve 134 which is pushed down by the user, the sliding sleeve 134 bounds back and resets under the action of the tension of the spring 133, and the rebounded and reset spring is in contact with the steel ball 131, to hold the steel ball to make the steel ball protrude from the inner wall of the female interface 130; and the steel ball 131 protruded from the inner wall of the female interface 130 is inserted in the ring groove 221 of the male connector 220 in the matching manner to achieve the limit, so that the mounting base 1 and the accessory mounting part 2 can be quickly connected in the matching manner of the male connector 220 and the female interface 130; and when the accessory mounting part 2 is removed from the mounting base 1, the sliding sleeve 134 is only needed to push down, so that the spring 133 is not in contact with the steel ball 131, and the steel ball 131 without the holding of the spring 133 is loose and can roll towards one side of the sliding sleeve 134, and at the moment, as long as the accessory mounting portion 2 is pulled towards the direction away from the female interface 130 through just a little bit of effort, the male connector 220 can be separated from the female interface 130, achieving the purpose of quick dismounting.

The concave-convex ordered male connection structure composed of a plurality of limited posts B222 on the male connector 220 is correspondingly matched with the concave-convex ordered female connection structure composed of a plurality of limited posts A135 in the female interface 130, that is, when the male connector 220 and the female connector 130 are inserted in a matching manner, the male connection structure and the female connection structure will be also inserted correspondingly to achieve the effect of joggling, which improves the stability of the quick connector structure, so that the male connector 220 is unable to rotate within the horizontal limit of the female interface 130.

Figure 2:
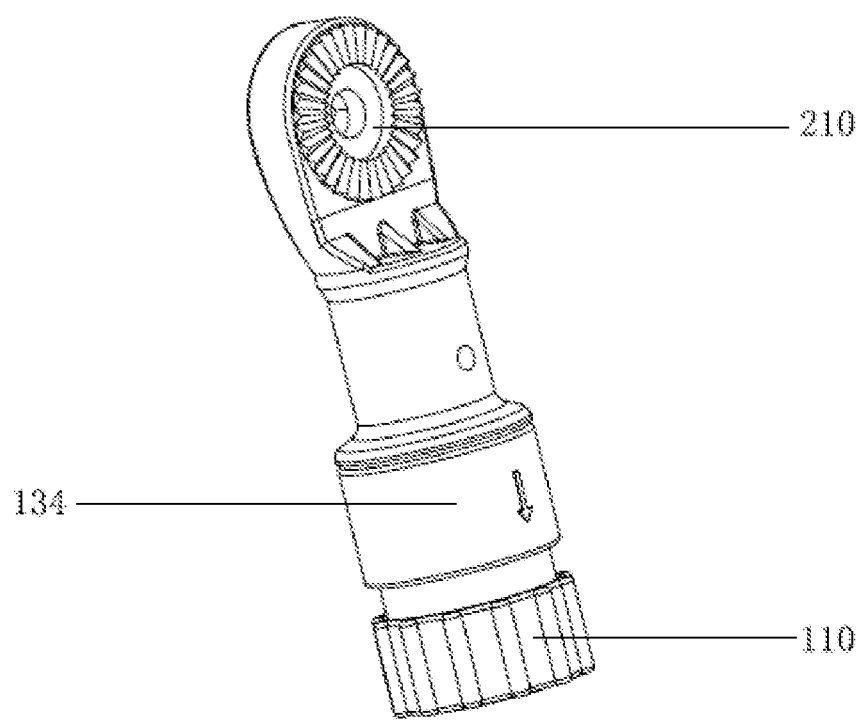
FIG. 2 is a diagram of a main structure of an embodiment 1 of the utility model.

In this embodiment, one end of the accessory mounting portion 2 is an accessory connector 210, and the accessory connector 210 is specifically composed of a bolt hole penetrating through the center of the connector and sawteeth circularly arranged on a connector surface, as shown in FIGS. 1-3; and an external accessory is equipped with a bolt hole and ringed sawteeth correspondingly being matched with the accessory connector 210, which can be detachably connected with the accessory connector 210, and the correspondingly matched ringed sawteeth can increase the stability of the connection between the external accessories and the accessory connector 210.

The external accessories may be a fishing rod, GPS navigation, a fish finder, etc.

In this embodiment, the mounting base 1 is a circular base, and a plurality of vertically oriented posts are circularly arranged on the outer side of the mounting base 1, which are arranged in an orderly manner to form a plurality of recessed structures 110 corresponding to the outer side of the mounting base, as shown in FIG. 4; and the recessed structure 110 can let the user grasp conveniently.

A threaded hole is arranged at the bottom center of the mounting base 1.

The threaded hole at the bottom of the mounting base 1 is specifically a hole with a downward opening, and a metal nut is fixedly arranged in the hole.

The mounting part is used for a hull 5, specifically arranged on a rail.

Figure 6:
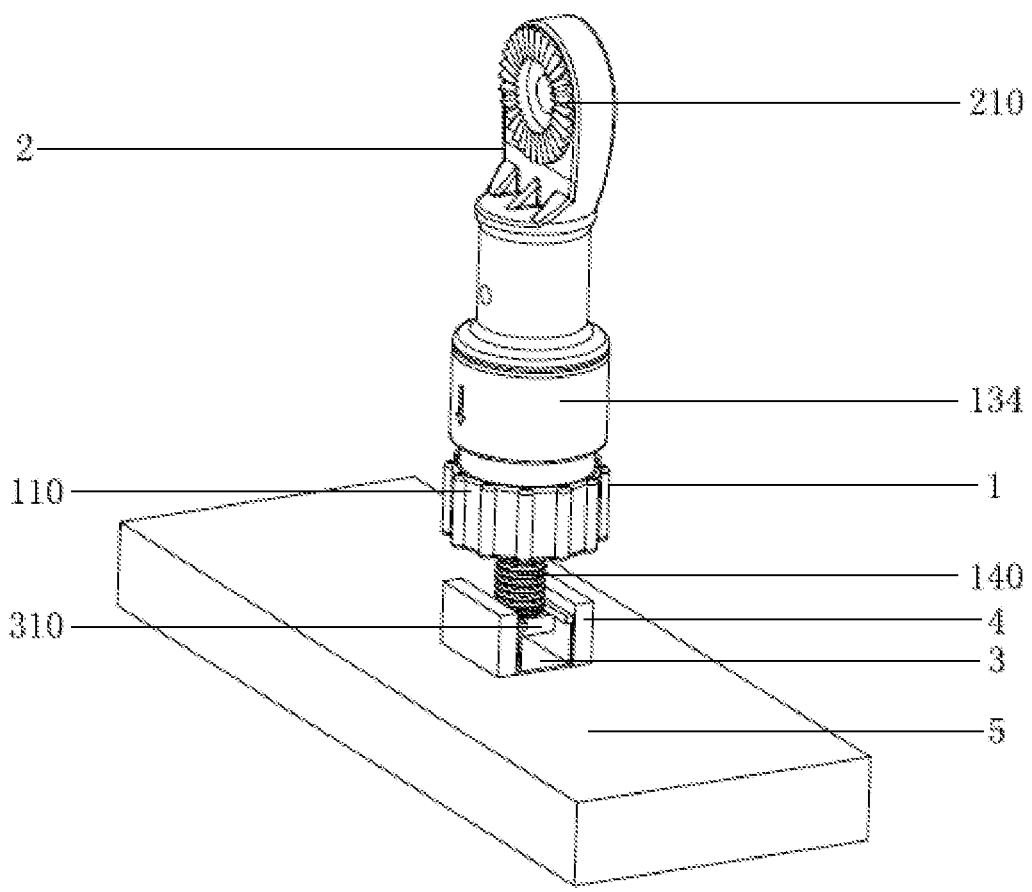
FIG. 6 is a diagram of a working state of an embodiment 1 of the utility model.

A sliding rail 3 is arranged on the hull 5, a sliding block 310 is arranged in the sliding rail 3, a screw stem 140 is fixedly arranged on an upper side of the sliding block 310; and the screw stem 140 is correspondingly matched with a threaded hole at the bottom of the mounting base 1; and the mounting base 1 can be connected with the screw stem 140 through the threaded hole at the bottom in a matching manner, as shown in FIG. 6.

The sliding block 310 in the sliding rail 3, the screw stem 140 on the sliding block 310 and the mounting base 1 connected with the screw stem 140 in the matching manner are all elastic connecting parts.

A bulged structure 4 is arranged on both sides of the sliding rail 3, and an upper surface of the bulged structure 4 is horizontally higher than the sliding rail 3.

When the screw stem 140 is continuously tightened with the threaded hole at the bottom of mounting base 1, the screw stem 140 will continue to sink into the mounting base 1, and the bottom of the mounting base 1 will continue to approach the sliding rail 3; in the final tightening state, the bottom of mounting base 1 will be closely attached to the bulged structure 4 to achieve the effect of locking, so that the mounting part cannot slide along the sliding rail 3; and the mounting base 1 and the screw stem 140 are loosened again, so that the mounting part can continue to slide on the sliding rail 3.

A mounting base 1 is provided with a rubber gasket, and the rubber gasket is fixedly arranged on a bottom surface of the mounting base 1, which can not only increase the friction force when the mounting base 1 is closely attached to the bulged structure 4, but also play the protection role when being arranged between the mounting base 1 and the bulged structure 4, avoiding the damage to the mounting base 1 or the bulged structure 4 due to excessive tightening.

The bulged structure 4 and the hull 5 are integrated as a whole.

The upper surface of the bulged structure 4 is higher than the sliding rail 3, so that the upper surface of the bulged structure 4 is directly and closely attached to the mounting base 1 in the tightening state, and in this way, compared with the condition that the mounting base 1 is closely attached to the surface of the sliding rail 3 in the tightening state, the damage caused by the excessive tightening of mounting base 1 to the surface of sliding rail 3 is avoided, which plays a role in protecting the sliding rail 3.

The screw stem 140 and the sliding block 310 are integrated as a whole.

FIG. 6 is only a schematic diagram, and the sliding rail 3 actually has a certain length.

Embodiment 2

Figure 7:
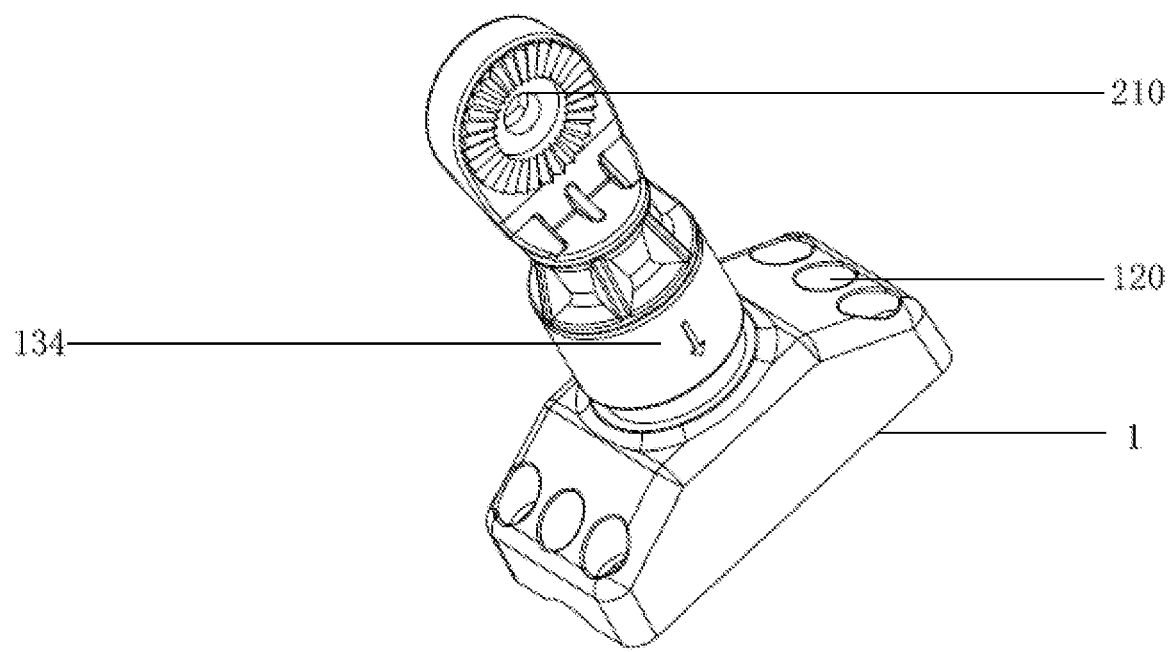
FIG. 7 is a diagram of a main structure of an embodiment 2 of the utility model.

The difference of this embodiment on the basis of embodiment 1 is that the mounting base 1 is rectangular, and there are a plurality of screw holes 120 vertically penetrating through both sides of the rectangular mounting base 1, as shown in FIG. 7.

Figure 8:
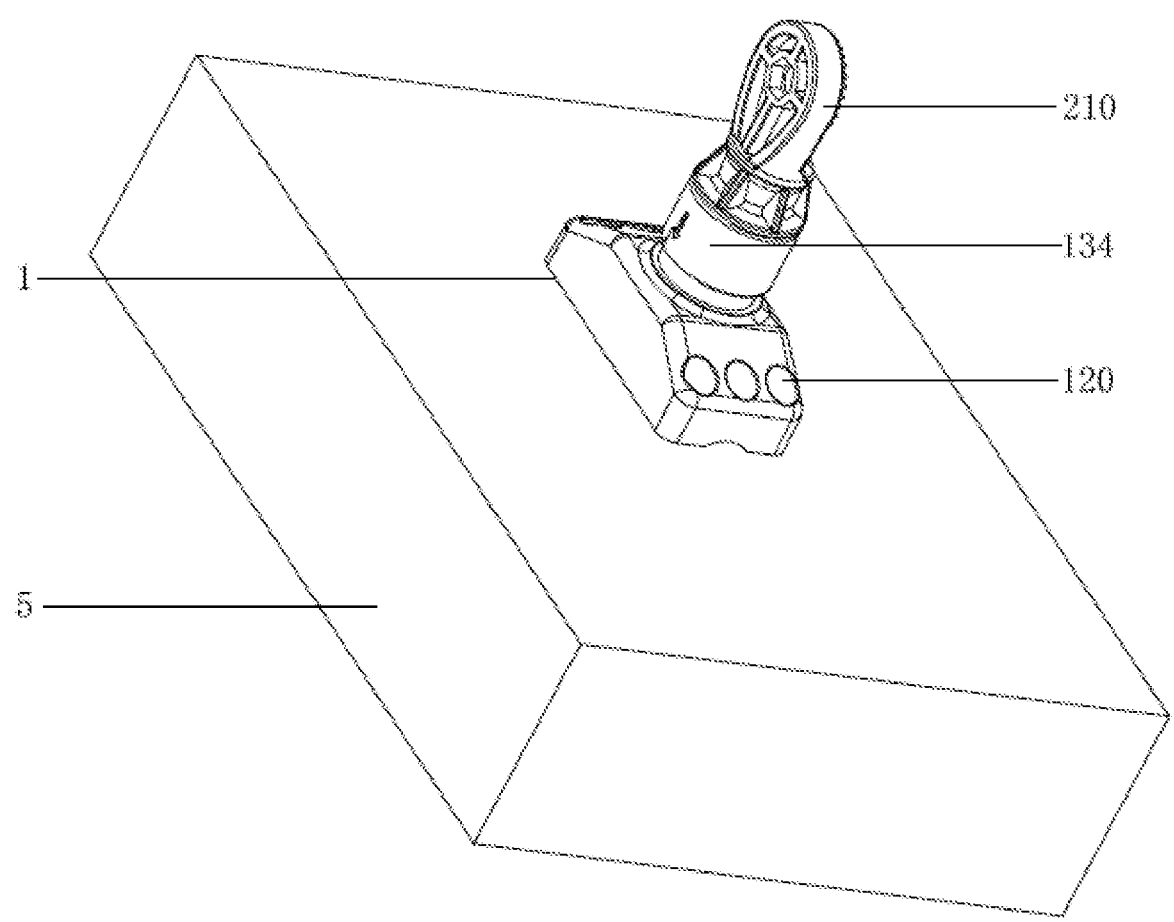
FIG. 8 is a diagram of a working state of an embodiment 2 of the utility model.

A plurality of threaded holes are arranged on the hull 5, corresponding to the screw hole 120 on the mounting base 1, so that the mounting base 1 can be directly fixed on the hull 5 through bolts, as shown in FIG. 8. Through the fastening mounting of the bolts, the mounting parts are connected with the hull 5, which has high stability, that is, the mounting base 1 is connected with the hull 5 with fasteners.

Embodiment 3

Figure 9:
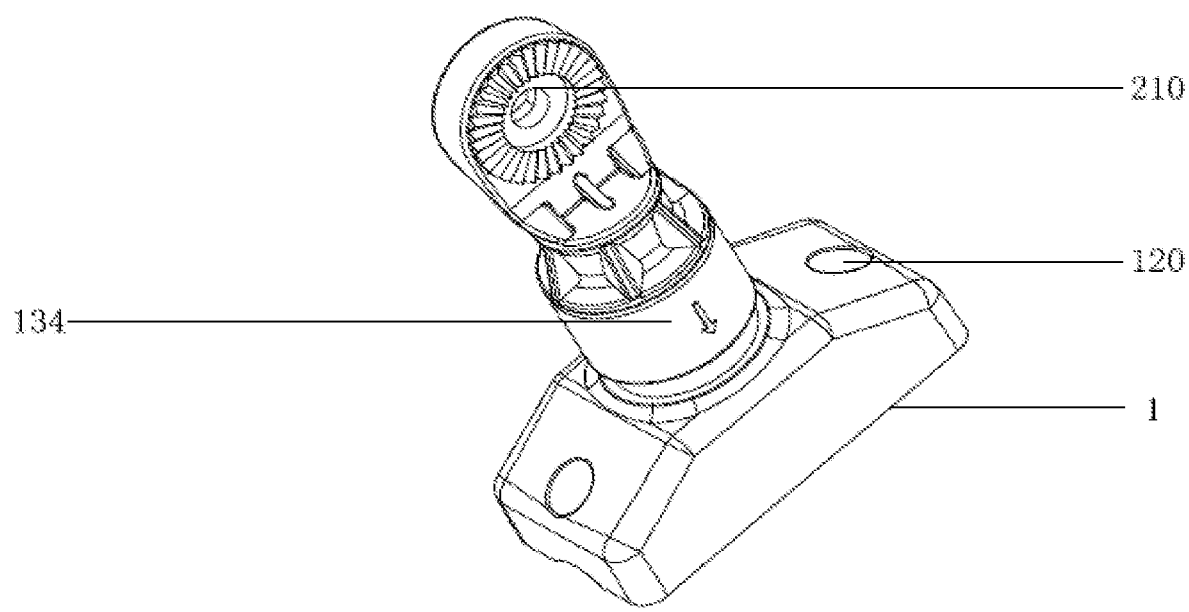
FIG. 9 is a diagram of a main structure of an embodiment 3 of the utility model.

The difference of this embodiment on the basis of embodiment 1 is that the mounting base 1 is rectangular, there are two screw holes 120 penetrating through the rectangular mounting base 1, and two screw holes 120 are correspondingly arranged on both sides of the rectangle, as shown in FIG. 9.

The sliding rail 3 is arranged on the hull 5, the sliding rail 3 is embedded in the hull 5, and the surface of the sliding rail 3 is horizontally higher than the hull 5.

Two sliding blocks 310 are arranged in the sliding rail 3, and the sliding blocks 310 are provided with the threaded holes with upward openings, which can be tightened with the bolts in a matching manner.

When the mounting part is arranged, the two screw holes 120 of the mounting base 1 correspond to the threaded holes of two sliding blocks 310 respectively, and the bolts are screwed into the threaded holes of the sliding blocks 310 from the screw holes 120 of the mounting base 1 from top to bottom and connected in a matching manner, and in this way, the mounting base 1 is connected with the sliding blocks 310 through bolts, and the bolts are tightened continuously, so that the bottom surface of the mounting base 1 is continuously close to an upper surface of the sliding rail 3, and finally, the bottom surface of the mounting base 1 is closely attached to the upper surface of the sliding rail 3, to realize the locking of the mounting parts; and the bolts are loosened again so that the mounting part can slide along the sliding rail 3 through the two sliding blocks 310.

Although the preferred embodiments of the utility model are described in detail above, it should be clearly understood that for those skilled in the art, various changes and variation can be made to the utility model. Any modification, equivalent replacement, improvement, etc. in the spirit and principle of the utility model shall be included in the protection scope of the utility model.

What is claimed is:

1. A marine mounting part, comprising a main body, the main body comprising a mounting part wherein the mounting part is provided with a mounting base and an accessory mounting portion, wherein the mounting base is provided with a quick connector, and the mounting base and the accessory mounting portion are movably connected through the quick connector; wherein the quick connector comprises:
    a male connector that is arranged on an end of the accessory mounting portion and is integrated with the accessory mounting portion as a whole, wherein the male connector is provided with a plurality of limited posts which are vertically oriented and are circularly arranged on a surface of the male connector and the limited posts and the male connector are integrated as a whole; and
    a female interface that is arranged on an end of the mounting base and is integrated with the mounting base as a whole, wherein a plurality of steel ball holes are arranged on a side wall of the female interface and a plurality of steel balls are arranged on the steel ball holes, and wherein a plurality of limited posts are arranged on an inner side wall of the female interface which are vertically oriented and are circularly arranged, and wherein the limited posts and the inner wall of the female interface are integrated as a whole;
    wherein the outer side wall of the female interface is sleeved with a spring and a sliding sleeve, wherein an inner wall of the sliding sleeve is connected with the spring in a matching manner; and
    wherein the male connector and the female interface can be plugged quickly and correspondingly, to quickly dismount the mounting base and the accessory mounting portion.

2. The marine mounting part according to claim 1, wherein the quick connector is also provided with a ring groove such that the surface of the male connector and the ring groove are adjacently provided with the plurality of limited post.

3. The marine mounting part according to claim 1, wherein the mounting base is provided with a recessed structure.

4. The marine mounting part according to claim 1, wherein the mounting base is provided with fasteners.

5. The marine mounting part according to claim 1, wherein the mounting base is provided with a sliding rail.

6. The marine mounting part according to claim 5, wherein the sliding rail is provided with an elastic connecting part.

7. The marine mounting part according to claim 6, wherein the elastic connecting part is provided with a bulged structure.

8. The marine mounting part according to claim 1, wherein the accessory mounting portion is provided with an accessory connector.

9. The marine mounting part according to claim 1, wherein the plurality of limited posts on the surface of the male connector form a concave convex ordered male connection structure.

10. The marine mounting part according to claim 9, wherein the male connection structure and the female connection structure are correspondingly matched when the male connector and the female connector are inserted in a matching manner.

11. The marine mounting part according to claim 1, wherein the plurality of limited posts on the surface of the male connector form a concave convex ordered male connection structure.

12. The marine mounting part according to claim 11, wherein the male connection structure and the female connection structure are correspondingly matched when the male connector and the female connector are inserted in a matching manner.

13. The marine mounting part according to claim 1, wherein the plurality of limited posts on the inner side wall of the female interface form a concave-convex ordered female connection structure.

14. The marine mounting part according to claim 13, wherein the male connection structure and the female connection structure are correspondingly matched when the male connector and the female connector are inserted in a matching manner.

15. The marine mounting part according to claim 1, wherein the plurality of limited posts on the inner side wall of the female interface form a concave-convex ordered female connection structure.

16. The marine mounting part according to claim 15, wherein the male connection structure and the female connection structure are correspondingly matched when the male connector and the female connector are inserted in a matching manner.

* * * * *